Dec. 12, 1967    A. VERLINDE    3,357,528
ELECTROMAGNETIC DISC BRAKE FOR ELECTRIC MOTOR
Filed May 23, 1966    2 Sheets-Sheet 1

Dec. 12, 1967  A. VERLINDE  3,357,528
ELECTROMAGNETIC DISC BRAKE FOR ELECTRIC MOTOR
Filed May 23, 1966  2 Sheets-Sheet 2

United States Patent Office 3,357,528
Patented Dec. 12, 1967

3,357,528
**ELECTROMAGNETIC DISC BRAKE
FOR ELECTRIC MOTOR**
Auguste Verlinde, Loos-lez-Lille, France, assignor to
Verlinde, S.A., a company of France
Filed May 23, 1966, Ser. No. 552,140
Claims priority, application France, May 21, 1965,
18,038
2 Claims. (Cl. 188—171)

ABSTRACT OF THE DISCLOSURE

Spring applied, electro-magnetically released spot type disc brake for electric motors wherein provision is made for adjusting the degree of spring application of the brake and wherein an automatic adjusting system is provided to adjust the air gap between the electromagnet and a pressure plate forming an armature.

---

The present invention relates to an electro-magnetic disc brake for electric motor consisting of two floating jaws bearing brake shoes acting on one part and the other of a disc rigid with the motor shaft when the feed of the motor is stopped.

It is known that in this type of brake when the motor is operating, the jaws sliding along guides are maintained in a position spaced apart from the disc by an electro-magnet acting against the action of pressure springs mounted in the yoke of the electro-magnet. When the feed to the engine is shut off, the action of the electro-magnet ceases, and the jaws under the action of the springs grip the disc thereby braking the motor shaft.

One drawback of this type of brake is that when the electro-magnet is fed, the play corresponding to the displacement of the two jaws with respect to the disc and corresponding to the air gap of the electro-magnet is not regularly distributed between each jaw and the disc. As a result it happens that only one jaw really moves while the other stays in contact more or less permanently with the rotating disc and wears out uselessly.

Another drawback is that it is impossible to vary the value of the braking couple and consequently to adapt the brakes of even the same series to motors of different power.

The present invention has for object to obviate these disadvantages by providing an electro-magnet disc brake for electric motor which avoids all premature wear of the brake lining and permits to regulate the value of the braking couple according to the power of the electric motor on which it is fitted.

This electro-magnetic disc brake is characterised in that it has means for automatically distributing the play between the jaws and the motor disc, and means for regulating the braking couple.

According to another characteristic of the invention, the means for automatically distributing the play between the jaws and the motor disc are advantageously constituted by members tending to move the yoke and the jaw stressed by the electro-magnet toward the motor disc by a value coresponding to half the value of the air gap, which determines the movement of the other jaw by an equal value. These members are formed by a spring cooperating with a rod rigid with the brake support and bearing an adjustable stop positioned in such a way as to limit the movement of the yoke to half the distance of the air gap. Each stop is formed by a nylon nut.

The means for regulating the value of the braking couple are constituted by screws acting on the pressure springs to modify their compression.

According to another characteristic of the invention, means are provided for limiting the air gap as a function of the wear of the brake lining of the jaws.

These means can consist of washers of a given thickness inserted between the jaw urged by the electro-magnet and the brake support.

These means can consist in a ring threaded inwardly, preferably with a very small thread and having lodgings for an adjusting key.

Other characteristics of the invention will be brought out from the following description made by way of non-limiting example with respect to the annexed drawing in which.

Figure 1:
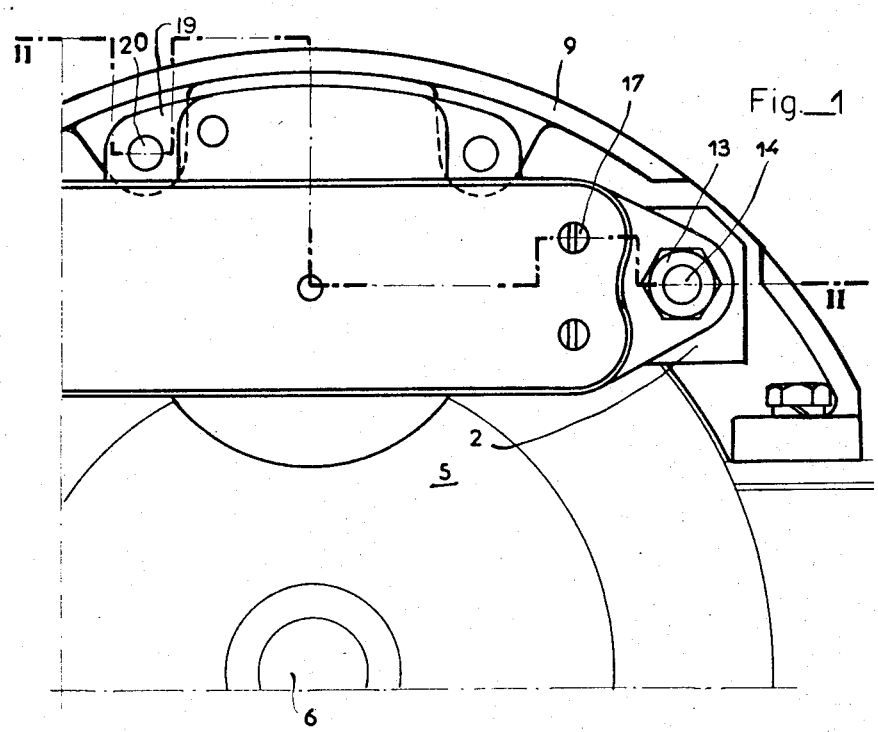
FIGURE 1 is a front view of a brake mounted on an electric motor.
Figure 2:
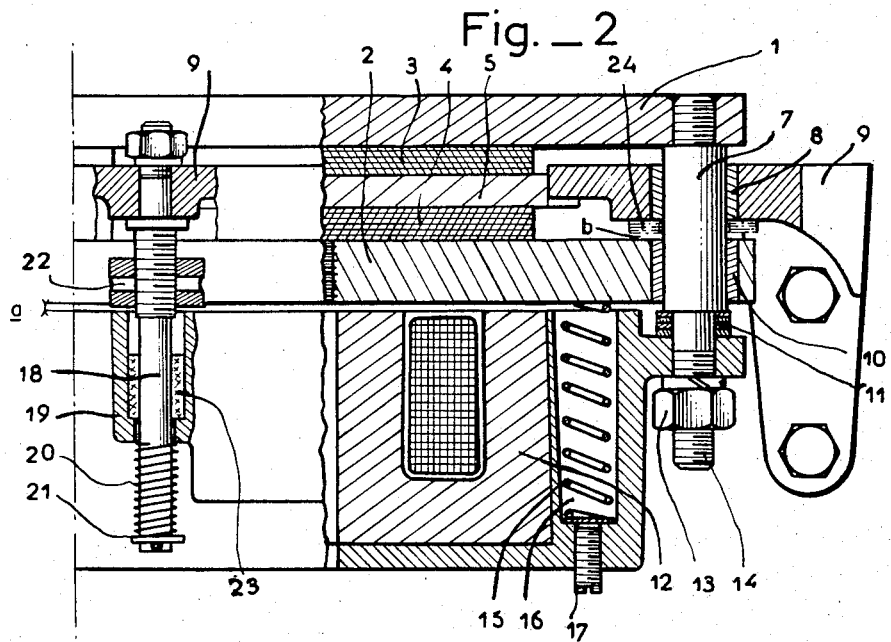
FIGURE 2 is a cross-sectional view taken along line II—II of FIGURE 1.

The electro-magnetic disc brake shown on the drawings comprises two jaws 1 and 2 each bearing a brake lining 3 and 4 respectively, mounted on either side of a disc 5 rigid with the shaft 6 of an electric motor.

The jaw 1 is rigid with guides 7 which are able to slide with respect to rings 8 made of self-lubricating material and carried by support 9 fixed on the motor, while jaw 2 comprises similar rings 10 for sliding on guides 7.

On guides 7 is mounted yoke 12 of an electro-magnet which bears against washers 11 forming thickness wedges for regulating the wear of the linings. Nuts 13 maintain the assembly.

Jaw 2 which forms one of the poles of the electro-magnet tends to be maintained in a position spaced apart from the yoke 12, forming the other pole, by pressure springs 15 mounted in lodgings 16 in the yoke and bearing on said jaw. Screws 17 permit to regulate the compression of the springs.

On support 9 are secured two rods 18 passing through housing 19 of the yoke 12 and each bearing a spring 20 which cooperates with an end washer 21 to urge the housing and the yoke toward the said support.

On each rod 18 is secured a nylon nut 22 forming a stop for limiting the movement of the yoke to a value corresponding to half the air gap $a$. These rods 18 are guided in a lodging of housing 19 by a nylon ring 23.

In the embodiments shown, it has been provided to limit the air gap $a$ in function of the wear of the brake linings 3 and 4. For this, there has been inserted between jaw 2 and support 9 washers 24 in such a way that the brake being blocked, there remains a small amount of play 6b between jaw 2 and the washers.

The functioning of this brake is the following:

When the electric motor is not fed the winding of the electro-magnet is not energised and jaws 1 and 2 pushed by springs 15 bear heavily on each side of the motor disc 5.

When the electric motor is fed with current, the coil of the electro-magnet is energised, yoke 12 attracts jaw 2 which moves a distance equal to the air gap $a$. In parallel fashion the rods 18 under the action of springs 20 push yoke 12 toward the support until the moment when the same hits against the nylon nut 22 which transforms the movement of the yoke with respect to the disc 5 to a value equal to half the air gap $a$. Consequently, yoke 12 pulls jaw 1 by a value equal to half the air gap $(a/2)$ being stopped by nut 22. The two jaws 1 and 2 are then at an equal distance from each side of disc 5.

The limitation of the air gap with the wear of the brake linings takes place in the following manner:

When the brake lining 4 borne by jaw 2 is worn, in this example by 3/10, the brake lining 3 of jaw 1 is also worn by 3/10. The air gap $a$ initially set at 5/10 of a millimeter by screw 17 is as a result of this wear brought to:

$$\frac{5+3+3}{10} = 11/10$$

This value of the air gap can be considered as a limit beyond which jaw 2 risks no longer to be attracted by the electro-magnet. It is therefore necessary to adjust the air gap.

In order to warn the user, the brake begins to slip. In effect the wear of the brake lining carried by jaw 2 being of 3/10 this jaw has advanced by 3/10 with respect to the motor disc 5 and support 9, in a blocked position of the brake. The washers 24 prevent this jaw from moving further toward the disc, and from then on only jaw 1 comes to contact with disc 5. The braking couple is then reduced by half and the brake slides abnormally.

In order to regulate the air gap, it suffices to remove one or two washers 11, forming thickness wedges, and to at the same time remove a washer 24 on each side.

The present invention provides an electro-magnetic disc brake for electric motor, the brake linings of which do not wear out irregularly owing to a poor distribution of the play separating them from the motor disc. Furthermore, the value of the braking couple of this brake can easily be adjusted in function of the power of the electric motor by simple movement of the screws regulating the compression of springs 15. Finally the air gap is limited in function of wear of the jaws, which increases the length of functioning of the brake despite wear.

Figure 3:
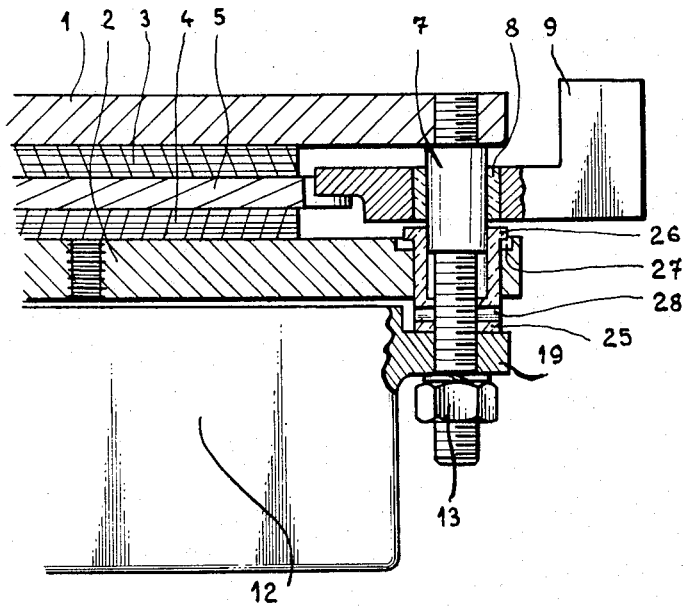
FIGURE 3 is a partial cross-sectional view taken along line II—II, of FIGURE 1 and showing one modification of the invention.

In a variation of the invention, the adjustment of the air gap and the limiting of the wear of the brake linings are obtained differently (FIGURE 3).

Jaw 1 is still rigid with guides 7 able to slide inside rings 8 of support 9 secured to the motor while jaw 2 slides now in rings 25 screwed on guides 7 by means of a key fitting in lodgings 28 (for example drilled or flattened sections) provided on rings 25.

In a preferred embodiment, the pitch of the interior threading of rings 25 will be very small.

The housing 9 of an electromagnet 12 is mounted on guide 7 and supported on rings 25 permitting a correction of the size of the air gap in function of the wear of the brake lining by screwing.

This housing 19 is secured by means of nuts 13.

As in the first embodiment, for a given wear of the brake lining, the air gap takes an excessive value and jaw 2 risks no longer to be attracted by electromagnet 12. It is therefore necessary in addition to the adjustment of the air gap as above to provide a means of avoiding too large an air gap.

For this purpose, rings 25 are obtained by free cutting leaving the small ring 26 limiting the movement of jaw 2.

In order to save space, it is evidently advantageous to provide a machined recess 27 in which ring 26 can lodge itself.

The space left between ring 26 and the bottom of the recess 27 corresponds to the permissible wear limit.

In fact a greater wear would no longer permit to the brake lining of jaw 2 to act on the disc and the braking couple would be reduced in half. The user thus is warned of the necessity for an adjustment by the excessive sliding.

It is evident that the present invention is not limited to the examples shown and described from which there can be provided other embodiments and modifications without departing from the spirit and scope of the invention.

What is claimed is:

1. An electromagnetic disc brake for an electromagnetic motor having a disc rigid with the motor shaft, comprising:
  (A) a support secured to said motor;
  (B) a housing having therein an electromagnet adapted to be energised when said motor is fed with current, said magnet having a yoke provided with springs and an air gap of a given dimension;
  (C) a pair of self-lubricating rings carried by the support;
  (D) a pair of jaws each carrying a brake lining adapted to contact said disc and brake the same; the first of said jaws being secured at one end of a rod and to a guide slidingly mounted in said rings; the second of said jaw being also secured to said guide and normally spaced apart from said yoke by said springs, said second jaw being attracted by said electromagnet when the same is energised whereby to grip said disc together with said first jaw;
  (E) a plurality of wear washers mounted on said rod and separating said guide from said yoke;
  (F) a pair of bars passing the said housing, each having springs urging said housing and said yoke toward said support, said bars having stops thereon for limiting said air gaps as a function of the wear of said brake linings; and,
  (G) means for adjusting the tension of said springs urging said second jaw away from said yoke and thereby adjusting the dimension of said air gap.

2. Brake according to claim 1, wherein said second jaw is mounted on rings screwed on said rod, one of said rings limiting the movement of said jaw, there being a recess in said jaw in which said ring fits at a predetermined point of wear of said brake lining of said jaw.

References Cited

UNITED STATES PATENTS 2,368,317　1/1945　Meyer et al. _____ 188—171
3,038,559　6/1962　Hirzel _____ 188—216 X DUANE A. REGER, *Primary Examiner.*